United States Patent
Turner

(10) Patent No.: US 11,214,708 B2
(45) Date of Patent: Jan. 4, 2022

(54) COATING SYSTEM HAVING HIGH SURFACE ROUGHNESS

(71) Applicant: SIKA TECHNOLOGY AG, Baar (CH)

(72) Inventor: Jeff Turner, Maplewood, NJ (US)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 17/084,888

(22) Filed: Oct. 30, 2020

(65) Prior Publication Data

US 2021/0355346 A1    Nov. 18, 2021

(30) Foreign Application Priority Data

May 14, 2020  (EP) ..................................... 20174799

(51) Int. Cl.
| | | |
|---|---|---|
| *C09D 175/08* | (2006.01) | |
| *C09D 7/61* | (2018.01) | |
| *C09D 5/00* | (2006.01) | |

(52) U.S. Cl.
CPC ............. *C09D 175/08* (2013.01); *C09D 5/00* (2013.01); *C09D 7/61* (2018.01)

(58) Field of Classification Search
CPC ........... C09D 175/08; C09D 7/61; C09D 5/00
See application file for complete search history.

(56) References Cited

FOREIGN PATENT DOCUMENTS

EP    1382625 A1    1/2004

OTHER PUBLICATIONS

Oct. 2, 2020 Extended Search Report issued in European Patent Application No. 20174799.5.

*Primary Examiner* — Robert S Walters, Jr.
(74) *Attorney, Agent, or Firm* — Oliff PLC

(57) ABSTRACT

A polyurea composition including a first component A with at least one isocyanate-functional polyurethane polymer P1 and a second component B including a blocked amine BA and optionally a polyamine PA having a molecular weight in the range from 60 to 500 g/mol. The polyurea composition further includes a silane S1 selected from the list consisting of isocyanatosilanes S1-1 and epoxy silanes S1-2 as well as an aminosilane S2 and an aggregate AG of an at 23° C. solid thermoset. The polyurea composition is notable for high surface roughness and for reliable and long-term bonding of the aggregates to the coating with no need for sealing. Further, the polyurea composition has enough adhesion to the substrate that the application of a primer layer on the substrate prior to application is not necessary.

12 Claims, No Drawings

COATING SYSTEM HAVING HIGH SURFACE ROUGHNESS

TECHNICAL FIELD

The invention relates to floor coating systems featuring enough surface roughness, especially for producing industrial floors or carpark floors.

PRIOR ART

For floor covering systems, especially for trafficable floors such as industrial floors, bridges, and floors in carparks, there exists a sometimes diverse profile of requirements, especially in relation to flexibility in conjunction with high abrasion resistance and chemical resistance.

With certain applications, furthermore, sufficient surface roughness is a prerequisite. In order to ensure such roughness, the applied coating system is typically strewn with silica sand or other construction aggregates before it is cured. After curing has been carried out, the excess/unincorporated silica sand is removed typically with a broom. In order to ensure reliable and long-term bonding of the aggregates, it is additionally necessary thereafter to apply a seal layer of sufficient thickness. This seal layer also increases abrasion resistance and toughness to withstand vehicular traffic, exposure to chemicals, and weathering.

A primer layer is typically required to achieve adhesion to the substrate, which is usually concrete. A second layer typically encompassing the aggregates must have flexibility to provide crack bridging, which is necessary to achieve long term water proofing.

These multiple application steps for said floor covering systems take up not only time but also large amounts of various materials.

SUMMARY OF THE INVENTION

The object of the invention, accordingly, was that of overcoming the above-discussed problems of the prior art, especially in order to provide a floor coating system which ensures sufficient surface roughness, can be produced more quickly, and entails less cost and usage of materials.

Surprisingly it would be possible to achieve this object through the provision of a coating system as claimed in the first main claim.

The object has surprisingly been achieved by means of a coating system as described hereinafter. A feature of this coating system is that the coatings obtained from it on the one hand already comprise an aggregate, meaning that subsequent strewing is not needed. Also not needed are the removal and expensive disposal of the excess/unincorporated silica sand.

Furthermore, the coating system attains sufficient surface roughness, and the coatings obtained ensures reliable and long-term bonding of the aggregates to the coating without the need of a sealing layer. Further, the coating system has enough adhesion to the substrate that the application of a primer layer on the substrate prior to application is obsolete.

Preferred embodiments of the composition are reproduced in the dependent claims. The invention is elucidated below comprehensively.

A WAY OF PERFORMING THE INVENTION

The invention relates to a polyurea composition comprising:
 a first component A comprising;
  at least one isocyanate-functional polyurethane polymer P1; and
 a second component B comprising;
  at least one blocked amine BA which has a blocked, hydrolytically activatable amino group and either at least one further blocked, hydrolytically activatable amino group or at least one reactive group R which is selected from the group consisting of hydroxyl group, mercapto group and secondary amino group;
  preferably at least one polyamine PA having a molecular weight in the range from 60 to 500 g/mol, especially 60 to 400 g/mol;
 wherein the polyurea composition further comprises:
  at least one silane S1 selected from the list consisting of isocyanatosilanes S1-1 and epoxy silanes S1-2;
  at least one aminosilane S2;
  at least one aggregate AG of an at 23° C. solid thermoset.
 The weight ratio between S1/S2 is >2, preferably 2.05-4.
 The total amount of the sum of (S1+S2) is 2-6 wt.-%, preferably 2.5-5 wt.-%, based on the total amount of the polyurea composition.

A "primary hydroxyl group" refers to an OH group which is bonded to a carbon atom with two hydrogens.

A "primary amino group" refers to an $NH_2$ group which is bonded to an organic radical, and a "secondary amino group" refers to an NH group which is bonded to two organic radicals which may also together be part of a ring.

"Molecular weight" in the present document is understood as the molar mass (in grams per mole) of a molecule. "Average molecular weight" refers to the number average $M_n$ of an oligomeric or polymeric mixture of molecules, which is typically determined using gel permeation chromatography (GPC) against polystyrene as standard.

"Storage-stable" or "storable" refers to a substance or a composition when it can be kept at room temperature in a suitable container for a prolonged time, customarily for at least 3 months up to 6 months or more, without any alteration in its application or service properties as a result of the storage to an extent relevant to its service.

"Room temperature" refers to a temperature of around 23° C.

A "diol chain extender" refers to an organic diol which is not a polymer.

The first component A comprises at least one isocyanate-functional polyurethane polymer P1.

The average molecular weight of polyurethane polymer P1 is preferably in the range from 1000 to 20 000 g/mol, more preferably in the range from 2000 to 10 000 g/mol.

The average NCO functionality of polyurethane polymer P1 is preferably in the range from 1.7 to 3, especially from 1.8 to 2.5. The average NCO functionality of polyurethane polymer P1 is more preferably in the range from 2.05 to 2.5.

The free isocyanate group content of polyurethane polymer P1 is preferably in the range from 1 to 10 wt %, more preferably in the range from 1 to 5 wt %.

A suitable isocyanate-functional polyurethane polymer P1 is obtainable from the reaction of at least one polyisocyanate with at least one polyol. This reaction may be effected by reacting the polyol and the polyisocyanate using customary processes, for example at temperatures of 50° C. to 100° C. with or without suitable catalysts, while the polyisocyanate has been dosed such that its isocyanate groups are present in a stoichiometric excess relative to the hydroxyl groups of the polyol. The polyisocyanate will advantageously have been dosed such that an NCO/OH ratio of 1.3 to 5, especially one of 1.5 to 3 is maintained. By "NCO/OH ratio" is meant the ratio of the number of isocyanate groups used to the number of hydroxyl groups used. After all the hydroxyl groups of the polyol have been converted, the polyurethane polymer P1 is preferably left with a free isocyanate group content of 1 to 10 wt %, more preferably of 1 to 5 wt %.

The polyol used for preparing a polyurethane polymer P1 is preferably selected from the list consisting of polyoxyalkylene polyol, polyester polyol, polycarbonate polyol, polyacrylate polyol and diol chain extender. Particular preference is given to polycarbonate polyols, polyoxyalkylene polyols, especially polyoxybutylene polyols, polyoxypropylene polyols and mixed polyoxyethylene-polyoxypropylene polyols and diol chain extender.

The diol chain extender is preferably an aliphatic or cycloaliphatic diol having a molecular weight in the range from 60 to 200 g/mol. Preferably the diol chain extender contains at least one primary hydroxyl group, more preferably two primary hydroxyl group. Most preferably the diol chain extender is 1,4 butanediol.

Most preferably, the polyols used for preparing the polyurethane polymer P1 are a mixture of at least one diol chain extender, especially 1,4 butanediol, and polyoxyalkylene polyols.

It is especially preferred it more than 70 wt.-%, more than 80 wt.-%, more than 90 wt.-%, especially more than 95 wt.-% of the polyols used are selected from the list consisting of at least one diol chain extender and polyoxyalkylene polyols, especially a mixture thereof. Preferably the weight ratio between the polyoxyalkylene polyols and the at least one diol chain extender is from 40:1 to 80:1, preferably 50:1 to 70:1, more preferably 55:1 to 60:1.

The average molecular weight of the polyol for preparing a polyurethane polymer P1, not including the diol chain extender, is preferably 500-20 000 g/mol, especially in the range from 1000 to 8000 g/mol.

The polyol for preparing a polyurethane polymer P1 is preferably a diol or a mixture between at least one diol and at least one triol, especially a mixture between at least one diol and at least one triol.

It may further be advantageous when the polyurethane polymer P1 comprises more than 80 mol %, more than 90 mol %, more than 95 mol %, especially more than 98 mol %, more preferably more than 99 mol %, of all the isocyanate groups of the first component A.

The second component B comprises at least one blocked amine BA which has a blocked, hydrolytically activatable amino group and either at least one further blocked, hydrolytically activatable amino group or at least one reactive group R which is selected from the group consisting of hydroxyl group, mercapto group and secondary amino group.

The blocked, hydrolytically activatable amino group of the blocked amine BA is selected in particular from the group consisting of enamino groups, oxazolidino groups, ketimino groups and aldimino groups. Such blocked amines BA are substances known in polyurethane chemistry which are used as so-called latent hardeners in compositions containing isocyanate groups.

In the present document, "oxazolidino group" refers to both tetrahydrooxazole groups (5-ring) and tetrahydrooxazine groups (6-ring).

Preferably, the blocked, hydrolytically activatable amino group of the blocked amine BA is an aldimino group.

The blocked amine BA can be obtained in particular from the condensation reaction of a primary or secondary amine with a ketone or aldehyde.

Particularly suitable as ketones are acetone, methyl ethyl ketone, methyl propyl ketone, methyl isopropyl ketone, methyl isobutyl ketone, methyl pentyl ketone, methyl isopentyl ketone, diethyl ketone, dipropyl ketone, diisopropyl ketone, dibutyl ketone, diisobutyl ketone, cyclopentanone, cyclohexanone and actetophen. Particularly suitable as aldehyde are formaldehyde, acetaldehyde, propanal, 2-methylpropanal, butanal, 2-methylbutanal, 2-ethylbutanal, pentanal, 2-methylpentanal, 3-methylpentanal, 4-methylpentanal, 2,3-dimethylpentanal, hexanal, 2-ethyl-hexanal, heptanal, octanal, nonanal, decanal, undecanal, 2-methyl-undecanal, dodecanal, methoxyacetaldehyde, cyclopropanecarboxaldehyde, cyclopentanecarboxaldehyde, cyclohexanecarboxaldehyde, diphenylacetaldehyde, benzaldehyde and substituted benzaldehydes.

A blocked amine BA having at least one oxazolidino group can be obtained in particular from the condensation reaction of at least one hydroxyamine in which the hydroxyl and primary amino groups are separated by an optionally substituted ethylene or trimethylene radical, with at least one ketone or aldehyde, in particular formaldehyde or one of the enolizable ketones or aldehydes mentioned; The aldehydes, in particular 2-methylpropanal, are particularly suitable. Particularly suitable as hydroxyamine are diethanolamine and diisopropanolamine, which lead to hydroxyoxazolidines from which polyoxazolidines can easily be prepared, for example by reaction with a polyisocyanate or a polyester.

A blocked amine BA having at least one ketimino or aldimino group can be obtained in particular from the condensation reaction of an amine having at least one primary amino group with at least one ketone or aldehyde, as mentioned above. If a ketone is used to block a primary amino group, a ketimino group is formed, while an aldimino group is formed when an aldehyde is used.

Suitable commercial ketimines or aldimines are, for example, Epikure® Curing Agent 3502 (from Resolution Performance Products), Desmophen® LS 2965A (from Bayer) and Vestamin® A 139 (from Evonik Degussa).

The second component B preferably comprises at least one polyamine PA having a molecular weight in the range from 60 to 500 g/mol, especially 60 to 400 g/mol.

The polyamine PA is preferably an aromatic polyamine, especially an aromatic polyamine selected from the list consisting of m-phenylenediamine, p-phenylenediamine, 4,4'-, 2,4'- and/or 2,2'-diaminodiphenylmethane, 3,3'-dichloro-4,4'-diaminodiphenylmethane (MOCA), 2,4- and/or 2,6-tolylenediamine, mixtures of 3,5-dimethylthio-2,4- and -2,6-tolylenediamine (available as Ethacure® 300 from Albermarle), mixtures of 3,5-diethyl-2,4- and -2,6-tolylenediamine (DETDA), 3,3',5,5'-tetraethyl-4,4'-diaminodiphenylmethane (M-DEA), 3,3',5,5'-tetraethyl-2,2'-dichloro-4,4'-diaminodiphenylmethane (M-CDEA), 3,3'-diisopropyl-5,5'-dimethyl-4,4'-diaminodiphenylmethane (M-MIPA), 3,3',5,5'-tetraisopropyl-4,4'-diaminodiphenylmethane (M-DIPA), 4,4'-diaminodiphenyl sulfone (DDS), 4-amino-N-(4-aminophenyl)benzene-sulfonamide, 5,5'-methylenedianthranilic acid, dimethyl (5,5'-methylene-dianthranilate), 1,3-propylene-bis(4-aminobenzoate), 1,4-butylene-bis(4-aminobenzoate), 1,2-bis(2-aminophenylthio)ethane, 2-methylpropyl 4-chloro-3,5-diaminobenzoate and tert-butyl 4-chloro-3,5-diaminobenzoate.

The polyamine PA is preferably an aromatic diamine, most preferably a mixture of 3,5-diethyl-2,4- and -2,6-tolylenediamine (DETDA).

The polyurea composition further comprises at least one silane S1 selected from the list consisting of isocyanatosilanes S1-1 and epoxy silanes S1-2.

This at least one silane S1 is preferably included in the first component A.

The at least one epoxy silane S1-2 is preferably of the formula (I)

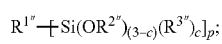                                                  (I)

or they consist of at least one reaction product of this type.

$R^1$ here is an n-valent organic radical with at least one primary and/or secondary amino group. $R^{1''}$ is a p-valent organic radical with at least one epoxy group. In addition, $R^2$ and $R^{2''}$ are each independently an alkyl group having 1 to 4 carbon atoms, and $R^3$ and $R^{3''}$ are each independently H or an alkyl group having 1 to 10 carbon atoms. Finally, a and c are each independently 0, 1 or 2 and p can be 1, 2, 3 and 4.

The epoxy silane may thus have one or more silane groups.

In a preferred embodiment, a is 0 and $R^2$ is methyl or ethyl. Additionally, preferably, c is 0 and $R^{2''}$ is methyl or ethyl.

More preferably, a and c are each 0, and $R^2$ and $R^{2''}$ are each methyl or ethyl, especially methyl. The index p is preferably 1.

The epoxy silane of the formula (I) is preferably an epoxy silane of the formula (II) or (III):

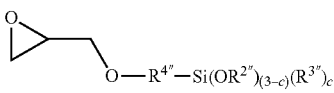                                                  (II)

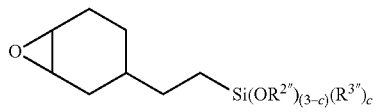                                                  (III)

where $R^{4''}$ is a linear or branched alkylene group having 1 to 6 carbon atoms, especially propylene.

Particularly suitable epoxy silanes have been found to be those of the formula (II) or (III) in which $R^{4''}$ is propylene, c is 0 and $R^{2''}$ is methyl or ethyl. The most preferred epoxy silanes are considered to be 2-(3,4-epoxycyclohexyl)ethyltrimethoxysilane, 2-(3,4-epoxycyclohexyl)ethyltriethoxysilane, 3-glycidyloxypropyltriethoxysilane and 3-glycidyloxypropyltrimethoxysilane.

The epoxy silane preferably bears a glycidyloxy group. Preferred epoxy silanes are considered to be 3-glycidyloxypropyltriethoxysilane and 3-glycidyloxypropyltrimethoxysilane. The most preferred epoxy silane is 3-glycidyloxypropyltrimethoxysilane.

Compounds of the formula (IV) are suitable as isocyanatosilanes S1-1

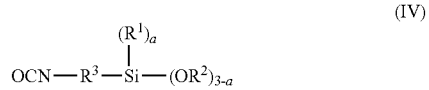                                                  (IV)

$R^1$, $R^2$, $R^3$ and a have already been described above.

Examples of suitable isocyanatosilanes S1-1 of the formula (IV) are isocyanatomethyltrimethoxysilane, isocyanatomethyldimethoxymethylsilane, 3-isocyanatopropyltrimethoxysilane, 3-Isocyanatopropyldimethoxymethylsilan, Isocyanatomethyltriethoxysilan, Isocyanatomethyldiethoxymethylsilan, 3-isocyanatopropyltriethoxysilane, 3-Isocyanatopropyldiethoxymethylsilan, and their analogues with isopropoxy groups instead of the methoxy or ethoxy groups on the silicon.

Preferably the isocyanatosilane S1-1 is 3-isocyanatopropyltrimethoxysilane.

For example, suitable isocyanatosilanes S1-1 are commercially available under the trade names Silquest® A-Link 35 from Momentive Performance Materials Inc., USA.

The polyurea composition further comprises at least one aminosilane S2.

This at least one aminosilane S2 is preferably included in the second component B.

In the present document, the terms "silane" and "organosilane" identify compounds which firstly have at least one, customarily two or three, hydrolysable groups, preferably alkoxy groups or acyloxy groups bonded directly to the silicon atom, preferably via Si—O bonds, and secondly have at least one organic radical bonded directly to the silicon atom via an Si—C bond.

Silanes of these kinds having alkoxy or acyloxy groups are also known by the person skilled in the art as organoalkoxysilanes and organoacyloxysilanes, respectively.

A property of such silanes is that of undergoing at least partial hydrolysis on contact with moisture. This hydrolysis produces organosilanols, these being organosilicon compounds containing one or more silanol groups (Si—OH groups), and subsequent condensation reactions produce organosiloxanes, these being organosilicon compounds containing one or more siloxane groups (Si—O—Si groups).

"Aminosilanes" is a term used for organosilanes whose organic radical has an amino group. "Primary aminosilanes" are aminosilanes which have a primary amino group, i.e., an $NH_2$ group bonded to an organic radical. "Secondary amino silanes" are aminosilanes which have a secondary amino group, i.e., an NH group bonded to two organic radicals.

The expression "independently of one another" here always means independently of one another in the same molecule if there are various possibilities.

Especially suitable aminosilanes S2 are aminosilanes selected from the group consisting of 3-aminopropyltrimethoxysilane, 3-aminopropyldimethoxymethylsilane, 3-amino-2-methylpropyltrimethoxysilane, 4-aminobutyltrimethoxysilane, 4-aminobutyldimethoxymethylsilane, 4-amino-3-methylbutyltrimethoxysilane, 4-amino-3,3-dimethylbutyltrimethoxysilane, 4-amino-3,3-dimethylbutyldimethoxymethylsilane, 2-aminoethyltrimethoxysilane, 2-aminoethyldimethoxymethylsilane, aminomethyltrimethoxysilane, aminomethyldimethoxymethylsilane, aminomethylmethoxydimethylsilane, N-methyl-3-aminopropyltrimethoxysilane, N-ethyl-3-aminopropyltrimethoxysilane, N-butyl-3-aminopropyltrimethoxysilane, N-cyclohexyl-3- aminopropyltrimethoxysilane, N-phenyl-3-aminopropyltrimethoxysilane, N-methyl-3-amino-2-methylpropyltrimethoxysilane, N-ethyl-3-amino-2-methylpropyltrimethoxysilane, N-ethyl-3-aminopropyldimethoxymethylsilane, N-phenyl-4-aminobutyltrimethoxysilane, N-phenylaminomethyldimethoxymethylsilane, N-cyclohexylaminomethyldimethoxymethylsilane, N-methylaminomethyldimethoxymethylsilane, N-ethylaminomethyldimethoxymethylsilane, N-propylaminomethyldimethoxymethylsilane, N-butylaminomethyldimethoxymethylsilane; N-(2-aminoethyl)-3-aminopropyltrimethoxysilane, 3-[2-(2-aminoethylamino)ethylamino]propyltrimethoxysilane, bis(trimethoxysilylpropyl)amine, and also analogs thereof having three ethoxy or three isopropoxy groups instead of the three methoxy groups on the silicon.

It is possible to use mixtures of such aminosilanes as aminosilane S2.

Preferably the aminosilane S2 is 3-Aminopropyltrimethoxysilane.

The weight ratio between S1/S2 is >2, preferably >2-4, 2.05-4, 2.05-3.5, 2.1-3.25, 2.15-3, 2.2-2.75, preferably 2.3-2.6. This has the advantage of a better adhesion of the cured polyurea composition on the substrate. This can be seen for example in table 2.

The total amount of the sum of (S1+S2) is 2-6 wt.-%, preferably 2.5-5 wt.-%, 2.75-4.5 wt.-%, more preferably 3-4 wt.-%, based on the total amount of the polyurea composition.

The polyurea composition further comprises at least one aggregate AG of an at 23° C. solid thermoset. This at least one aggregate AG is preferably included in the first component A.

The at 23° C. solid thermoset is preferably selected from the list consisting of polyallyl diglycol carbonate, styrene acrylonitrile, cross linked polyvinyl chloride, cross linked urea formaldehyde and nylon, preferably polyallyl diglycol carbonate.

Preferably the aggregate AG has a particle size of 500-5000 microns, more preferably 750-3500 microns, 850-3000 microns, most preferably 1000-2500 microns.

Preferably, the thermoset material of the aggregate AG contains reactive sites that react with polyamines, polyalcohols and polybasic acids.

Is it further preferred if the aggregate AG has a specific gravity ($H_2O=1$) from 1.05-1.5, preferably 1.1-1.4, more preferably 1.2-1.3.

Is it also preferred if the aggregate AG has a hardness (Rockwell, M-scale) from M70-M120, preferably M95-M110.

Preferably the amount of aggregate AG is 10-40 wt.-%, preferably 12.5-35 wt.-%, 15-30 wt.-%, more preferably 17.5-25 wt.-%, based on the total weight of the polyurea composition.

For example, suitable aggregate AG are commercially available under the trade name ResNSand from R.J. MARSHALL COMPANY (MI, USA).

In this document, the term "construction aggregate", or simply "aggregate", is preferably understood as coarse- to medium-grained particulate material used in construction.

In this document, the term "particle size" is preferably understood as the "mean particle size". The term "mean particle size" refers here preferably to the D50 value of the cumulative volume distribution curve, at which 50 vol % of the particles have a diameter which is smaller than the value. The mean particle size or the D50 value is determined preferably by laser diffractometry.

Preferably, the polyurea composition contains less than 5 wt.-%, less than 4 wt.-%, less than 2 wt.-%, less than 1 wt.-%, less than 0.5 wt.-%, more preferably less than 0.1 wt.-%, of at least one inorganic aggregate AZ.

Such inorganic aggregate AZ preferably have a particle size in the range from 0.2 to 3.0 mm. The inorganic aggregates preferably have an apparent density of >2.0 $kg/dm^3$.

The inorganic aggregates in question may come from natural deposits, examples being river gravel, moraine gravel, etc., which customarily have an apparent density of 2.2-3 $kg/dm^3$. Also possible, however, are recycled granules from old crushed concrete, with an apparent density of around 2.4 $kg/dm^3$.

Particularly preferred are inorganic aggregates comprising silica sand or corundum, especially comprising silica sand.

As and when required, the polyurea composition may comprise one or more additives. By adding additives to the polyurea composition it is possible to modify the properties of the coatings formed from it. Additives can be used, for example, to adjust the viscosity or the color of the polyurea composition.

Examples of possible additives are preferably selected from the list consisting of pigments, fillers, catalysts, emulsifiers, UV-absorbers and film-forming assistants.

The ratio of the groups reactive toward isocyanate groups, such as especially hydroxyl groups, primary and secondary amino groups, and aldimino groups, to the isocyanate groups in the polyurea composition is suitably in the range from 0.5 to 1.1, preferably in the range from 0.7 to 1.05, very preferably in the range from 0.8 to 1.0, especially about 0.95.

The curing reaction commences with the mixing of the first component A with the second component B. The reaction leads to an increase in viscosity and eventually to the curing of the polyurea composition, thereby ultimately curing the polyurea composition.

The present invention accordingly also describes a cured composition obtained from an aforementioned polyurea composition after the mixing of the first component A with the second component B and their curing.

In a further aspect, the invention also relates to the use of an above-described polyurea composition as a coating.

Suitable substrates for the polyurea composition, especially the floor coating and preferably, in particular, industrial-floor, bridge, and parking-deck coating, are in principle all substrates which are present in edifices. Examples of suitable substrates are concrete, cement screed, magnesia screed, ceramic tiles, asphalt, and any existing synthetic resin coatings.

This use may preferably involve use in a floor coating system, preferably consisting of:
  no primer layer,
  at least one layer of the above-described polyurea composition,
  no top coat/sealing layer.

To produce the floor coating system of the invention, preferably no primer layer is applied to the substrate, optionally after customary substrate pretreatment, such as grinding, sandblasting, shot blasting or caustic treatment with solvents or acids, for example.

For application, the freshly mixed polyurea composition is preferably applied as a layer to a planar or slightly inclined substrate, typically by being poured onto the substrate and then spread flatly to the desired layer thickness, using a roller, a spreader, a notched trowel or a spatula, for example.

Application takes place preferably within the open time of the polyurea composition. The "open time" or else "pot life" here refers to the time elapsing between the mixing of the components A and B and the end of a state of the composition in which it is suitable for working.

After the coating system has been applied, it is worked on preferably with a roll, especially a structured roll. A structured roll of this kind preferably has a roll width of 10-80 cm, especially 15-40 mm, and a roll diameter of 4-20 mm, especially 6-10 mm.

This working, especially rolling, using a roll, especially a structured roll, is preferably accomplished within the open time of the coating system. The working preferably takes place immediately after application of the coating system, preferably 5-20 min after application of the coating system.

Preferably a layer thickness in the range from 1.5 to 6 mm, 3 to 5 mm, especially 3 to 4.5 mm, is applied in one operation.

The coating system described is preferably applied as one layer.

With preference no further aggregates are applied to/strewn into the coating system layer described, such as, for example, sand, gravel or other aforesaid aggregates, after the application of the layer of the coating system.

Preferably no topcoat/sealing layer is applied to the polyurea composition of the coating system. A "seal" in this context refers to a transparent or pigmented, high-grade coating which is applied as the uppermost, thin layer to a coating. It protects and enhances the surface of the coating. A typical layer thickness in this case, in the dry state, is in the range from 0.03 to 1 mm, especially 0.03 to 0.3 mm, more preferably 0.1 to 0.2 mm (around 150 g/m$^2$).

Particular preference is given to use in a floor coating system selected from the group consisting of floor coating systems for balconies, patios, squares, industrial floors, bridges, and parking decks, especially industrial floors, bridges, and parking decks, very preferably parking decks.

In a further aspect the invention also relates to a method for producing a coating with an above-described polyurea composition, wherein the method comprises the following method steps:
a) mixing the first component A with the second component B,
b) applying the resulting mixed polyurea composition to a substrate,
c) preferably working the applied polyurea composition, and
d) curing the applied polyurea composition.

The substrates mentioned are preferably a substrate as described above.

Additionally, in this method, preference is given to the production of coatings of the kind described above as preferred floor coatings.

The mixing of the first component A with the second component B takes place preferably:
at temperatures in the range from 5 to 40° C.;
within 1-10 min, especially within 2-6 min.

The mixed polyurea composition obtained is applied preferably as described above for the use of the coating system, the application of the polyurea composition, working on the applied polyurea composition using a roller, especially structured roller, and also layer thickness. The embodiments specified above in this context as being preferred are also preferred for the method.

It is especially preferred if after step c) no further aggregates are applied to/scattered into the described polyurea composition layer, such as, for example, sand, gravel or other aforementioned aggregates, after the application of the polyurea composition.

After step d) it is advantageous to apply no further layers, as stated above. It is further preferred if the substrate in step b) does not contain a primer layer, as stated above.

EXAMPLES

Given below are working examples which are intended to further elucidate the invention described. Of course, the invention is not confined to these working examples described.

Commercial Substances Used:
Propylene carbonate Propylene carbonate (solvent)
1,4 butanediol 1,4 butanediol
Polyether triol Polypropylene oxide-based triol, Mw: 3,000 g/mol,
Catalyst 1 Dibutyltin dilaurate (DBTL)
IPDI IPDI Monomer, Mw: 222.3 g/mol
TiO$_2$ Titanium dioxide, pigment
Catalyst 2 Ethylacetoacetate titanate
Deformer Defoaming agent
Ultra 8 ResNsand Ultra 8, aggregate of thermoset Polymer Resin (polyallyl diglycol carbonate), particle size 1680-2380 microns, specific gravity (H$_2$O=1): 1.26, hardness (Rockwell, M-scale): M95-M110, R.J. MARSHALL COMPANY (MI, USA)
Ultra 12 ResNsand Ultra 12, aggregate of thermoset Polymer Resin (polyallyl diglycol carbonate), particle size 1190-1680 microns, specific gravity (H$_2$O=1): 1.26, hardness (Rockwell, M-scale): M95-M110, R.J. MARSHALL COMPANY (MI, USA)
Silica sand Particle size=0.6-1.2 mm
A-1110 3-Aminopropyltrimethoxysilane, Mw: 221.4 g/mol, aminosilane, Silquest® A-1110, Momentive Performance Materials, Germany
A-187 3-Glycidyloxypropyltrimethoxysilane, Mw: 236.1 g/mol, epoxy silane, Silquest® A-187, Momentive Performance Materials, Germany
A-Link 35 3-Isocyanatopropyltrimethoxysilane, Mw: 205.28 g/mol, isocyanatosilane, Silquest A Link 35, Momentive Performance Materials, Germany
Polyamine PA Mixture of 3,5-diethyl-2,4- and -2,6-tolylenediamine, Lonzacure DEDTA 80
Blocked amine BA Amine with blocked aldimino group, Vestamin A 139, Evonik
UV absorber 1 Hydroxyphenyl benzotriazole class, Tinuvin® 1130, BASF
UV absorber 2 Hindered amine class, Tinuvin® 1130, BASF Production and Application of the Mixed Polyurea Composition, and Methods of Testing:

In order to prepare the isocyanate-functional polyurethane polymer P1 of the component A, the relevant raw materials were heated to 70° C. and reacted for 2 hours. The remaining additives and pigments for the component A were added and mixed for 10 min using a cowles mixer.

The adhesion was measured at 23° C. by sandblasting a concrete surface. The mixed polyurea composition was applied with a thickness of 1.5 mm and a Flexitape (Sika® Flexitape Heavy, Sika Corporation USA, Flexitape was cut into 2.5 cm wide strips by 15.25 cm long) was fully embedded into the uncured composition. After 1 week at 23° C. the Flexitape was pulled by hand and the failure method was evaluated. If material was pulled/peeled off the substrate (adhesive failure) this was considered a "Failure". When the sample showed cohesive failure between the composition and the substrate the result was rated "Passing".

The abrasion was determined using a test equipment consisting of a compressed air operated machine (pressure ca. 5 bar) which moves a car wheel mechanically on the coating system under test and turns it on its axis.

The tyre is loaded at a weight of 400 kg and is turned at a maximum angle of deflection of 100° back and forth as 1 cycle. The tests are run so that the temperature on the coating surface does not rise above 65° C. Samples that showed no cracks, no aggregates broken out after the testing were labeled "no damages". Samples that showed visible cracks and/or individual aggregates broken out after the testing were labeled "slight damages".

Samples that showed larger ares without or completely removed coating after the testing were labeled "destroyed".

The layer thickness of the coating was 1.4 mm

The crack bridging was determined according to ASTM C957-06.

"Pass" means no cracking

"Fail" means cracking

TABLE 1 composition 1

| Composition 1 Raw material | Wt.-% |
|---|---|
| Component A | |
| Propylene carbonate | 5.68 |
| 1,4 butanediol | 0.89 |
| Polyether triol | 49.79 |
| Catalyst 1 | 0.03 |
| Catalyst 2 | 0.34 |
| IPDI | 14.87 |
| $TiO_2$ | 0.66 |
| Deformer | 0.71 |
| Ultra 8 | 13.14 |
| Ultra 12 | 5.63 |
| Component B | |
| Polyamine PA | 3.30 |
| Blocked amine BA | 3.30 |
| UV absorber 1 | 0.83 |
| UV absorber 2 | 0.83 |
| Total | 100.00 |

TABLE 2 adhesion testing,

| Compositions | Composition 1 with addition of silanes (added wt.-% of silane*) | Cohesive Failure |
|---|---|---|
| E1 | No silanes added | Failure |
| E2 | 1% A link 35 | Failure |
| E3 | 2% A link 35 | Failure |
| E4 | 3% A link 35 | Failure |
| E5 | 4% A link 35 | Failure |
| E6 | 1% A1110 | Failure |
| E7 | 2% A1110 | Failure |
| E8 | 3% A1110 | Failure |
| E9 | 4% A1110 | Failure |
| E10 | 1% A187 | Failure |
| E11 | 2% A187 | Failure |
| E12 | 3% A187 | Failure |
| E13 | 4% A187 | Failure |
| E14 | A35 1%/A1110 1% | Failure |
| E15 | A35 2%/A1110 1% | Failure |
| E16 | A35 3%/A1110 1% | Passing |
| E17 | A35 1%/A1110 1%/A187 1% | Failure |
| E18 | A35 1.5%/A1110 1%/A187 1% | Passing |

* = based on the total weight of the final composition

TABLE 3 crack bridging and abrasion testing,

| Compositions | Crack bridging | Abrasion |
|---|---|---|
| Composition E18 but without Ultra 8 and without Ultra 12. | Pass | n.d. |
| Composition E18 but replacement of Ultra 8 and Ultra 12 with the same amount of silica sand | Fail | "slight damages" after 1000 cycles |
| Composition E18 | Pass | "no damages" after 5000 cycles | n.d. = not determined

The invention claimed is:

1. A polyurea composition comprising:
   a first component A comprising;
      at least one isocyanate-functional polyurethane polymer P1;
   a second component B comprising;
      at least one blocked amine BA which has a blocked, hydrolytically activatable amino group and either at least one further blocked, hydrolytically activatable amino group or at least one reactive group R which is selected from the group consisting of hydroxyl group, mercapto group and secondary amino group;
   wherein the polyurea composition further comprises:
      at least one silane S1 selected from the list consisting of isocyanatosilanes S1-1 and epoxy silanes S1-2;
      at least one aminosilane S2;
      at least one aggregate AG of an at 23° C. solid thermoset;
   wherein the weight ratio between S1/S2 is >2, and the total amount of the sum of (S1+S2) is 2-6 wt. % based on the total amount of the polyurea composition.

2. The polyurea composition as claimed in claim 1, wherein the polyurethane polymer P1 is prepared from polyols that are a mixture of at least one diol chain extender and polyoxyalkylene polyols.

3. The polyurea composition as claimed in claim 1, wherein the blocked, hydrolytically activatable amino group of the blocked amine BA is an aldimino group.

4. The polyurea composition as claimed in claim 1, wherein the second component B further comprises at least one polyamine PA having a molecular weight in the range from 60 to 500 g/mol.

5. The polyurea composition as claimed in claim 1, wherein the epoxy silane S1-2 is 3-glycidyloxypropyltrimethoxysilane.

6. The polyurea composition as claimed in claim 1, wherein the isocyanatosilane S1-1 is 3-Isocyanatopropyltrimethoxysilane.

7. The polyurea composition as claimed in claim 1, wherein the aminosilane S2 is 3-Aminopropyltrimethoxysilane.

8. The polyurea composition as claimed in claim 1, wherein the weight ratio between S1/S2 is 2.05-3.5.

9. The polyurea composition as claimed in claim 1, wherein the total amount of the sum of (S1+S2) is 2.75-4.5 wt. % based on the total amount of the polyurea composition.

10. The polyurea composition as claimed in claim 1, wherein the at 23° C. solid thermoset is selected from the list consisting of polyallyl diglycol carbonate, styrene acrylonitrile, cross linked polyvinyl chloride, and cross linked urea formaldehyde.

11. The polyurea composition as claimed in claim 1, wherein the polyurea composition contains less than 5 wt. % of at least one inorganic aggregate AZ.

12. A method for producing a coating with a polyurea composition as claimed in claim 1, the method comprising the following method steps:
   a) applying the polyurea composition to a substrate, and
   b) curing the applied polyurea composition.

* * * * *